Figure 1:
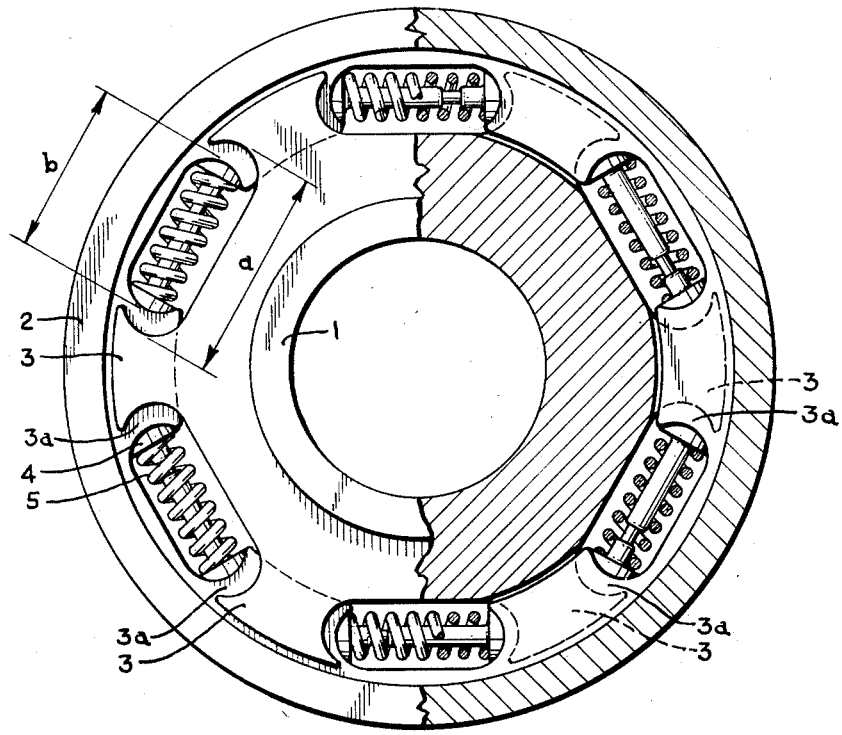

July 21, 1959        J. KLOUD        2,895,316

ELASTIC COUPLING

Filed Nov. 14, 1957        2 Sheets-Sheet 1

INVENTOR.
JAN KLOUD
BY
Richard Low

July 21, 1959  J. KLOUD  2,895,316
ELASTIC COUPLING
Filed Nov. 14, 1957  2 Sheets-Sheet 2

INVENTOR.
JAN KLOUD
BY
Richard Law

# United States Patent Office 2,895,316
Patented July 21, 1959

2,895,316

ELASTIC COUPLING

Jan Kloud, Holyne, near Slivenec, Czechoslovakia, assignor to Vyzkumny a zkusebni letecky ustav, Letnany, near Prague, Czechoslovakia Application November 14, 1957, Serial No. 696,557

2 Claims. (Cl. 64—27)

The present invention relates to an elastic coupling having a non-linear response or characteristic and being used for damping torsional oscillations.

In internal combustion engines, the so-called critical torsional speed is rather dangerous for the safety of crankshafts and other transmission parts and sometimes even for the engine case. The critical torsional speed occurs in multicylinder engines at high speed where a smaller or larger torsional deviation occurs. If this torsional deviation surpasses a certain limit, the stress on the material of the shaft or other engine part may surpass the fatigue limit and the shaft or other engine part breaks. Different arrangements have been suggested to prevent this occurrence. Different elastic couplings and similar devices are used to alter the frequency of the torsional oscillations and thus to transfer the critical torsional speed into a speed range beyond the service speed of the engine, or special dampers are provided on the shafts, which are intended to damp these dangerous oscillations. These dampers require however a special design of the crankshaft and increase the weight of the engine, and their design and adjustment are rather difficult.

Elastic couplings used at the present time, which reduce the natural frequency of the mass of a crankshaft system, namely for oscillations with one nodal point, are of different types and arrangements. The reduction of the natural frequency may be however accomplished only within certain limits, and it may happen that, even in the case of a reduced natural frequency, some torsional critical frequencies, which threaten the safety of the crankshaft, may remain within the service speed range. In that case the characteristic of the elastic coupling must be chosen so that the frequency of the whole crank shaft system changes with an increase in the amplitudes of the torsional oscillations thereby to shift the critical speed to a range beyond the service speed and to damp the increased torsional amplitudes.

An elastic coupling having a so-called non-linear characteristic, that is, a coupling in which the transmitted torque has a non-linear dependence on the deformation of the elastic element, is therefore required.

Different types of elastic elements are used with couplings of this kind, for example, elastic elements of rubber, elastic elements using a fluid such as oil, and mechanical elastic elements, such as springs.

Elastic elements of rubber are comparatively simple, they are however not sufficiently durable and their damping effect changes with use and aging. Elastic elements using a fluid require elaborate constructions, so that they are expensive and are also sensitive to the wear of the cooperating faces and to the proper adjustment of the component parts.

For these reasons, the most frequently used elastic elements for this purpose are mechanical springs of different design. Some couplings of this kind are provided with inner and outer coupling members with interposed specially designed springs. The non-linear characteristic is obtained by changing the length of the active part of the spring. These couplings are however rather complicated, their weight is considerable and the manufacture of specially designed springs requires special manufacturing methods. Other known elastic couplings have only a slight non-linearity in their characteristic and may generally serve only for a constant reducing of the natural frequency of the crank system without regard to the damping of torsional oscillations.

It is an object of the present invention to provide an elastic coupling with mechanical springs for damping torsional oscillations, and which is simple in design and to manufacture and has the lowest possible weight.

The coupling according to the present invention comprises an inner coupling member and a relatively angularly displaceable annular outer coupling member with radially outwardly directed tooth-like extensions on the inner coupling member and radially inwardly directed tooth-like extensions on the outer coupling member, the tooth-like extensions of both coupling members defining a number of circumferential clearances therebetween, with the clearances of each coupling member corresponding to clearances of the other coupling member, springs carried by spring holders interposed in each clearance between adjacent extensions of both coupling members for transmitting the torque between both coupling members, the circumferential distance between corresponding adjacent extensions of both coupling members being different for at least a number of said extensions so that said spring members interposed in said clearances become successively effective to transmit torque at different angular displacements between both coupling members.

Figure 5:
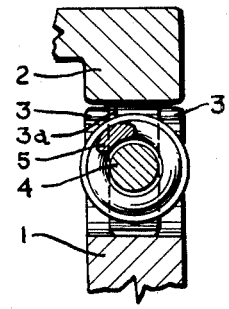
Figure 2:
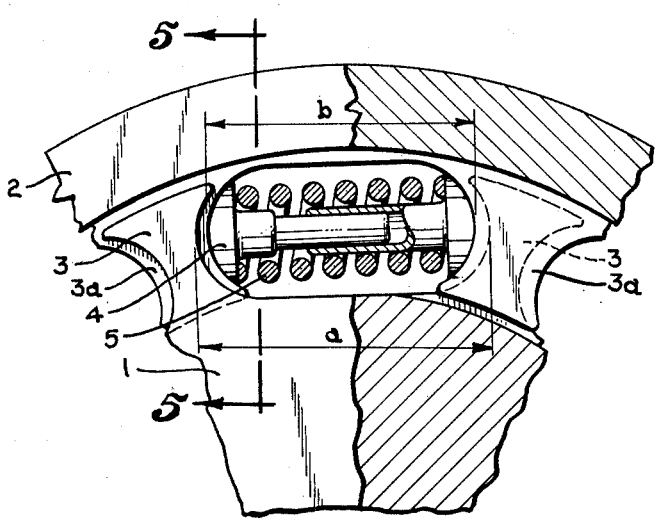
Figure 3:
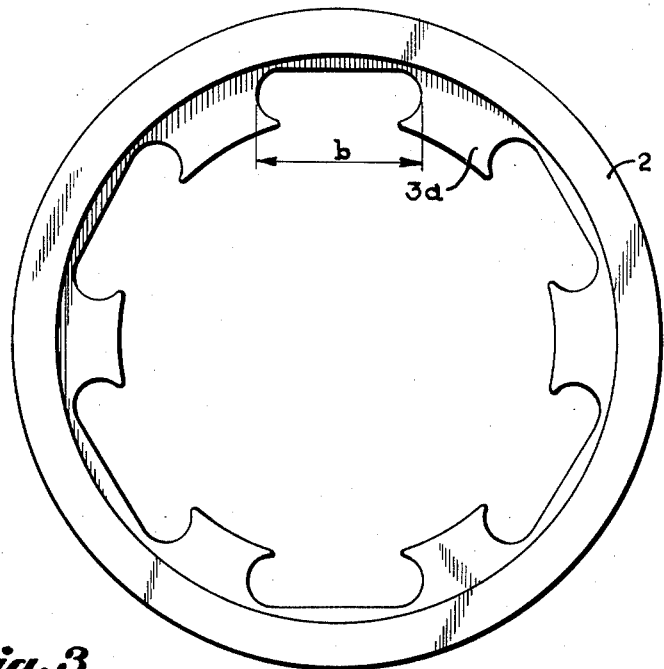
Figure 4:
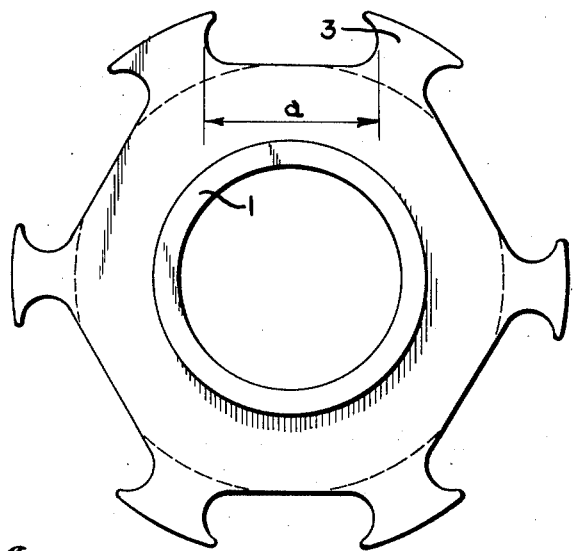

An embodiment of the invention is hereinafter described in detail with reference to the accompanying drawing, where Fig. 1 is a diagrammatic front elevational view of the coupling, with the inner coupling member being partly broken away and in section, Fig. 2 is a detailed view of a portion of Fig. 1, Figs. 3 and 4 are elevational views of the outer and inner coupling members, respectively, and Fig. 5 is a sectional view along the line 5—5 of Fig. 2.

The coupling comprises an inner coupling member 1 (see also Fig. 4) and an annular outer coupling member 2 (see also Fig. 3). The circumference of the inner coupling member 1 is provided with radially outwardly directed extensions 3, while similar radially inwardly directed extensions 3a are formed on the inner periphery of the annular outer coupling member 2. Between these extensions 3 and 3a circumferential clearances are provided, with the circumferential widths of the corresponding extensions 3 and 3a on both coupling members being different for at least some of these extensions, so that the circumferential length $b$ of the clearance on the outer coupling member 2 is different from the length $a$ of the corresponding clearance of the inner coupling member 1. Helical compression springs 5 carried by spring holders 4 are interposed between the extensions 3 and 3a in the clearances therebetween, with the opposite ends of the holders 4 initially bearing against the extensions defining the smaller clearance therebetween, for example, against the extensions 3a of the outer member 2, as in the arrangement illustrated in Figs. 1 and 2. Thus, some of the spring holders will bear only against the extensions of one of the coupling members, while the holders of the springs transmitting the torque, will bear at one end against the corresponding extensions 3 and 3a of both coupling members, and, at the other end, against only the extensions 3a of coupling member 2.

Due to the irregular lengths of the clearance $a$ and $b$ on both coupling members, the individual springs 5 become effective to transmit the torque in succession as required by the desired non-linear characteristic of the coupling. In addition the characteristic of the coupling may be influenced by a different initial compression of the springs 5 or by using springs of different thickness.

The elastic coupling according to this invention is able to efficiently damp torsional oscillations, and it permits the easy selection of the initial compression of the springs 5 so as to suit any given conditions. Further the coupling is easy to manufacture and to assemble and its weight is lower than that of most couplings used at present for this purpose. It is suitable for any kind of power transmission, for example as a coupling between reduction gears and aircraft engines..

What I claim is:

1. An elastic coupling comprising relatively angularly displaceable inner and outer coupling members, outwardly directed tooth-like extensions on said inner coupling member and corresponding inwardly directed tooth-like extensions on said outer coupling member, the successive tooth-like extensions on each of said coupling members defining circumferential clearances therebetween, with the extensions of said inner coupling member being in juxtaposed relation to the corresponding extensions of said outer coupling member, and springs carried by spring holders interposed in each clearance between adjacent extensions of both coupling members for transmitting a torque between the latter, the circumferential distances between corresponding adjacent extensions of said inner and outer coupling members, respectively, being different for at least a number of said extensions so that said springs interposed in said clearances are successively effective to transmit torque between said coupling members at different relative angular displacements of the latter.

2. An elastic coupling comprising relatively angularly displaceable inner and outer coupling members, outwardly directed tooth-like extensions on said inner coupling member and corresponding inwardly directed tooth-like extensions on said outer coupling member, the successive tooth-like extensions on each of said coupling members defining circumferential clearances therebetween, with the extensions of said inner coupling member being in juxtaposed relation to the corresponding extensions of said outer coupling member, and springs carried by spring holders interposed in each clearance between adjacent extensions of both coupling members for transmitting a torque between the latter, said springs being initially stressed to different extents.

References Cited in the file of this patent

UNITED STATES PATENTS

| 813,204 | Frayer et al. | Feb. 20, 1906 |
| 1,445,716 | Robinson et al. | Mar. 9, 1921 |

FOREIGN PATENTS

| 326,390 | France | May 26, 1903 |
| 166,939 | Great Britain | July 18, 1921 |
| 1,036,839 | France | April 29, 1953 |